(12) United States Patent
Ito

(10) Patent No.: US 12,556,544 B2
(45) Date of Patent: Feb. 17, 2026

(54) ACCESS MANAGEMENT SYSTEM

(71) Applicant: FUJIFILM Corporation, Tokyo (JP)

(72) Inventor: Atsushi Ito, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 19/086,678

(22) Filed: Mar. 21, 2025

(65) Prior Publication Data

US 2025/0254175 A1 Aug. 7, 2025

Related U.S. Application Data

(63) Continuation of application No. PCT/JP2023/029250, filed on Aug. 10, 2023.

(30) Foreign Application Priority Data

Sep. 21, 2022 (JP) ................... 2022-150471

(51) Int. Cl.
*H04L 9/40* (2022.01)
(52) U.S. Cl.
CPC ................. *H04L 63/105* (2013.01)
(58) Field of Classification Search
CPC ..................................... H04L 63/10
USPC .............................................. 726/4
See application file for complete search history.

(56) References Cited

U.S. PATENT DOCUMENTS

| 10,284,565 B2* | 5/2019 | Wu ....................... H04L 9/3271 |
| 2005/0262132 A1* | 11/2005 | Morita ................ G06F 21/6218 |
| | | 707/999.102 |
| 2014/0082748 A1 | 3/2014 | Gomi |
| 2019/0394204 A1 | 12/2019 | Bansal et al. |
| 2021/0185531 A1* | 6/2021 | Avetisov ............. H04W 12/108 |

FOREIGN PATENT DOCUMENTS

| JP | 2014-056550 A | 3/2014 |
| JP | 2019-175374 A | 10/2019 |
| JP | 2021-528722 A | 10/2021 |

OTHER PUBLICATIONS

International Search Report issued in PCT/JP2023/029250; mailed Oct. 24, 2023.
Written Opinion of the International Searching Authority issued in PCT/JP2023/029250; mailed Oct. 24, 2023.

\* cited by examiner

*Primary Examiner* — Jahangir Kabir
(74) *Attorney, Agent, or Firm* — Studebaker Brackett PLLC

(57) ABSTRACT

In a case where an update of identification information is performed, a content of the update (identification information after update) is stored on a blockchain. In addition, in a case where the update of the identification information is performed, a TEE determines whether or not the update content is related to an access condition. Then, in a case where it is determined that the update content is related to the access condition, a data store terminal is notified that the update is performed.

7 Claims, 7 Drawing Sheets

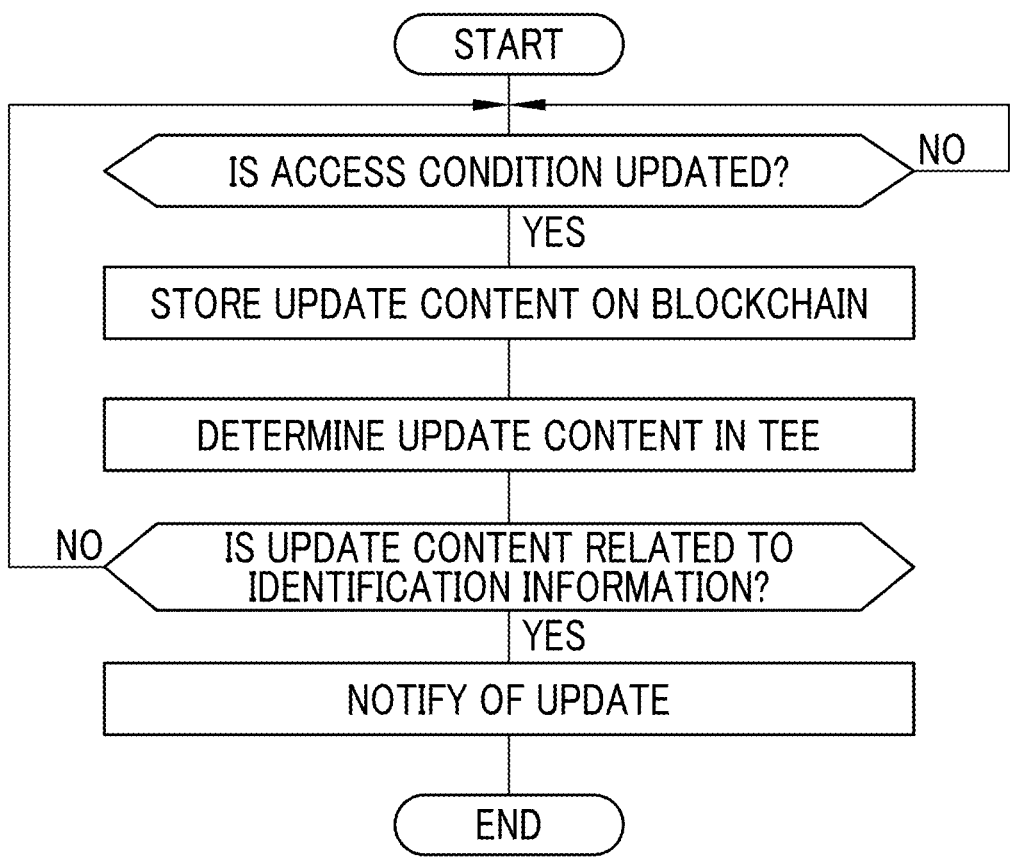

ACCESS MANAGEMENT SYSTEM

CROSS-REFERENCE TO RELATED APPLICATIONS

This application is a Continuation of PCT International Application No. PCT/JP2023/029250 filed on 10 Aug. 2023, which claims priority under 35 U.S.C § 119(a) to Japanese Patent Application No. 2022-150471 filed on 21 Sep. 2022. The above application is hereby expressly incorporated by reference, in its entirety, into the present application.

BACKGROUND OF THE INVENTION

1. Field of the Invention

The present invention relates to an access management system.

2. Description of the Related Art

An access management system determines whether or not an access is available by collating identification information with an access condition. In addition, JP2021-528722A (corresponding to US2019/0394204A1) describes a configuration in which identification information managed by a third party can be used. In this manner, it is possible to reduce a management cost of the identification information.

SUMMARY OF THE INVENTION

Meanwhile, in JP2021-528722A, there is a problem in that information is unnecessarily diffused in a case of updating the identification information or the like. That is, in a case where the identification information is updated, a management side of the identification information needs to notify an access management side of a content of the update, and the access management side needs to change (update) an access condition based on the notification and the like. Meanwhile, notifying the access management side of the update that is not related to the access condition causes the unnecessary diffusion of the identification information. In addition, in order to notify only an update related to the access condition, the access management side publishes the access condition to the management side of the identification information, which causes unnecessary diffusion of the access condition.

The present invention has been made in view of the above background, and an object of the present invention is to provide an access management system capable of preventing unnecessary diffusion of information.

According to an aspect of the present invention, there is provided an access management system comprising: a data store terminal that determines whether or not an access is available by collating identification information of a user who performs an access request with an access condition; a specific ID management server that stores identification information of a specific user who is a user belonging to a specific group; and at least one processor, in which the data store terminal accepts an access request from the specific user, which is an access request using the identification information stored in the specific ID management server, and the processor is configured to: perform an update of the identification information stored in the specific ID management server; in a case where the update is performed, store a content of the update on a blockchain; and in a case where the update is performed, cause a trusted execution environment (TEE) independent of an operating system (OS) of the data store terminal and an OS of the specific ID management server to determine whether or not the update is related to the access condition by comparing the content of the update with the access condition, and notify the data store terminal that the update has been performed in a case where it is determined that the update is related to the access condition.

It is preferable that the processor is configured to notify the data store terminal of the content of the update.

It is preferable that the processor is configured to notify the data store terminal of all of the content of the update.

It is preferable that the processor is configured to notify the data store terminal of only a part of the content of the update, which is related to the access condition.

The access condition may be stored in the data store terminal.

The access condition may be stored in a terminal different from the data store terminal.

It is preferable that the at least one processor is provided in the specific ID management server, and the processor provided in the specific ID management server performs the update of the identification information.

It is preferable that the processor is configured to: perform an update of the access condition; store a content of the update of the access condition on the blockchain; and in a case where the update of the access condition is performed, cause the TEE to determine whether or not the update of the access condition is related to the identification information by comparing the content of the update of the access condition with the identification information, and notify the specific ID management server that the update of the access condition has been performed in a case where it is determined that the update of the access condition is related to the identification information.

According to the present invention, it is possible to provide an access management system capable of preventing unnecessary diffusion of information.

BRIEF DESCRIPTION OF THE DRAWINGS

FIG. 11 is a flowchart illustrating a flow of a process of a second embodiment.

DESCRIPTION OF THE PREFERRED EMBODIMENTS

First Embodiment

Figure 1:
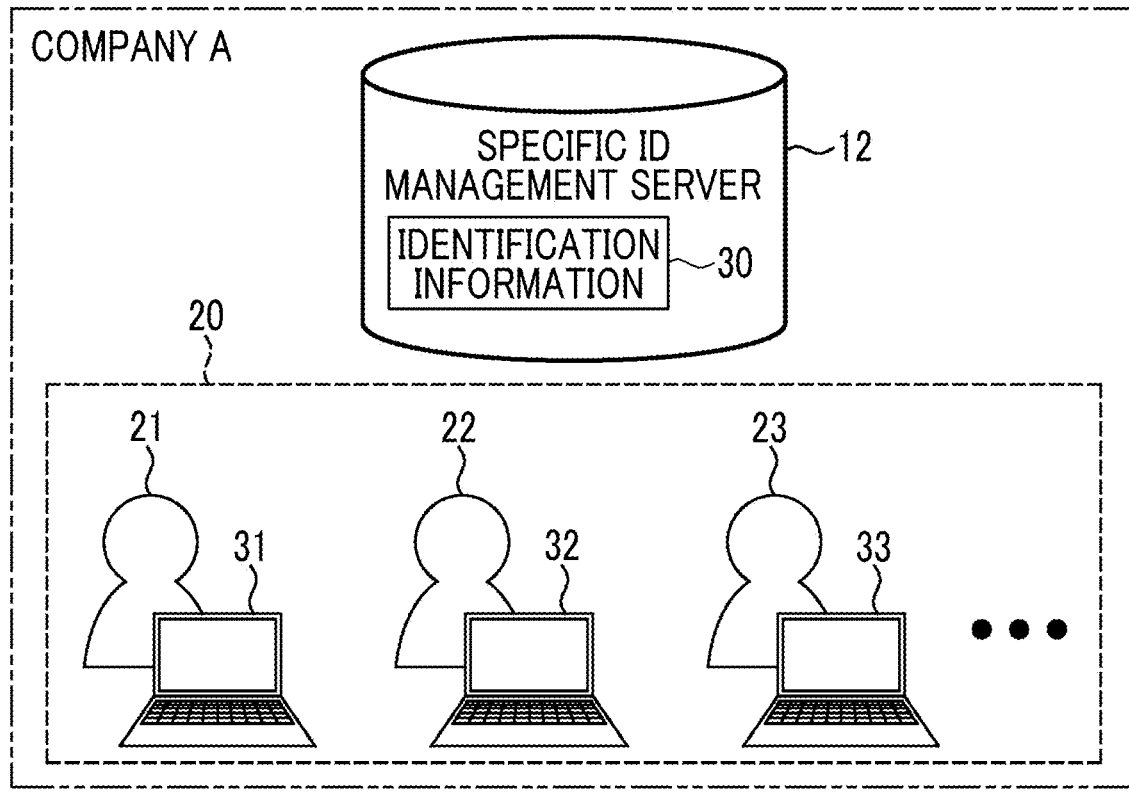
FIG. 1 is a schematic diagram illustrating a configuration of an access management system.
Figure 1:
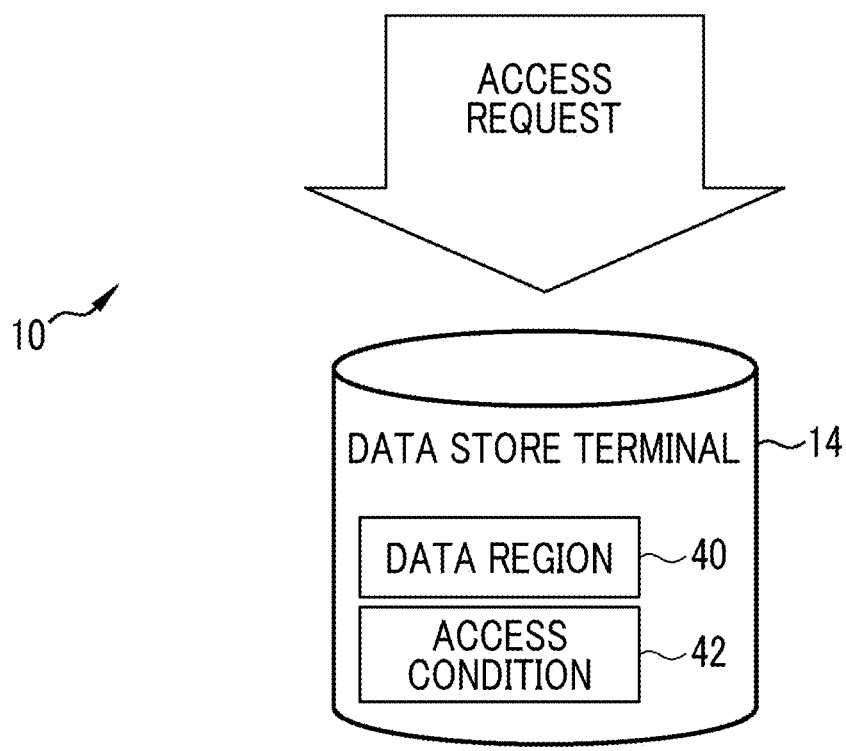

In FIG. 1, an access management system 10 according to an embodiment of the present invention comprises a specific ID management server 12 and a data store terminal 14.

The specific ID management server 12 stores identification information 30 indicating an identification of users (specific users) 21, 22, and 23 belonging to a specific group 20. The specific group 20 is a group of the users (specific users 21, 22, and 23) having a specific common point, and in the present example, the specific group 20 is "Company A" and the specific users 21, 22, and 23 are "employees of Company A". In FIG. 1, reference numerals 31, 32, and 33 indicate terminals of the specific users 21, 22, and 23, respectively.

Figures 2, 3, 4:
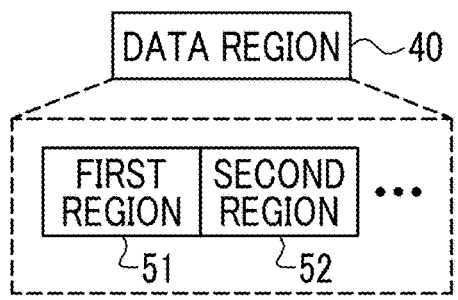
FIG. 2 is an explanatory diagram of identification information.
FIG. 3 is an explanatory diagram of a data region.
FIG. 4 is an explanatory diagram of an access condition.

As illustrated in FIG. 2, the identification information 30 is information in which information related to an identification, such as a name, an affiliated department, an employment type, a position, and a year of joining, is associated with each of employees of Company A, which are the specific users 21, 22, and 23, in the present example, "Taro Fuji", "Jiro Fuji", and "Hanako Fuji". The identification information 30 is managed by the specific group 20, that is, "Company A". Specifically, a process of updating the identification information 30, such as an increase in the number of members by new employment, a deletion of a member by retirement, and a change in an affiliated department by a transfer, is appropriately executed under management of Company A.

With reference to FIG. 1, the data store terminal 14 stores a data region 40 in which various types of data are stored, and an access condition 42 indicating a condition for accessing the data region 40. As illustrated in FIG. 3, the data region 40 is further divided into a plurality of regions such as a first region 51 and a second region 52.

As illustrated in FIG. 4, the access condition 42 is provided for each region of the data region 40. In the present embodiment, "an employee of Company A and a section chief or higher" is set as the access condition 42 to the first region 51. In addition, as the access condition 42 to the second region 52, "an employee of Company A and a development department" is set.

With reference to FIG. 1, in a case where the specific user 21 (for example, "Taro Fuji") who is an employee of Company A desires to access the data region 40, the specific user 21 transmits an access request to the data region 40, from the terminal 31 of the specific user 21 to the data store terminal 14 by using the identification information 30 of the specific user 21 stored in the specific ID management server 12. In a case where the access request is accepted, the data store terminal 14 collates the identification information 30 of a person (for example, "Taro Fuji") who performs the access request with the access condition 42 to determine whether or not the access is available, and allows the access to a region determined to be accessible. For example, in a case where the person who performs the access request is "Taro Fuji" illustrated in FIG. 2, it is determined that an access to the second region 52 is available as illustrated in FIG. 4, and access to the second region 52 is allowed.

In this manner, in the access management system 10, since the data store terminal 14 determines whether or not an access is available by using the identification information 30 managed by a third party (in the present embodiment, "Company A"), a management cost for the identification information 30 can be reduced, as compared with a case where the data store terminal 14 independently creates and manages the identification information and determines whether or not the access is available by using the identification information.

In the present example, the case where the specific group 20 is "Company A", that is, the case where the specific user is "an employee of Company A" is described, and the present invention is not limited to this. For example, the specific group may be formed by further subdividing one company (group), such as a sales department of Company A, a managerial position of a section chief or higher in the sales department of Company A, an employee who joins the sales department of Company A for three years or more, and a regular employee who joins the sales department of Company A for three years or more. In addition, the specific group does not necessarily have to be a concept including a group in an organization such as a company, and may be a set that satisfies a certain requirement, that is, a group collected from the viewpoint of a specific age group, a gender, a possession qualification, a role, a work location, and the like.

In addition, in the present example, an example in which the access request is made to the data store terminal 14 only from one specific group 20 (A company) is illustrated, and the present invention is not limited to this. A configuration may be adopted in which the access request is made from a plurality of specific groups such as Company B, Company C, and Company D to the data store terminal 14. In this case, a specific ID management server may be provided for each specific group, and identification information of a user (specific user) of the corresponding specific group may be managed in each specific ID management server. In addition, one ID management server may be provided for the plurality of specific groups, and the identification information may be managed by such one ID management server. Further, a plurality of ID management servers that manage the identification information of the plurality of specific groups as described above may be provided.

In addition, in the present example, the specific ID management server 12 is provided in the company A, and the specific ID management server 12 may be provided outside the company A. In addition, the identification information 30 is stored in the specific ID management server 12, and the identification information 30 may be stored outside the specific ID management server 12. Further, although an example in which the access condition 42 is stored in the data store terminal 14 is described, the access condition 42 may be stored outside the data store terminal 14.

As described above, in the access management system 10, the management cost of the identification information 30 can be reduced by using the identification information 30 managed by the "Company A" which is a third party by the data store terminal 14. Meanwhile, only this may cause unnecessary diffusion of information.

Figure 5:
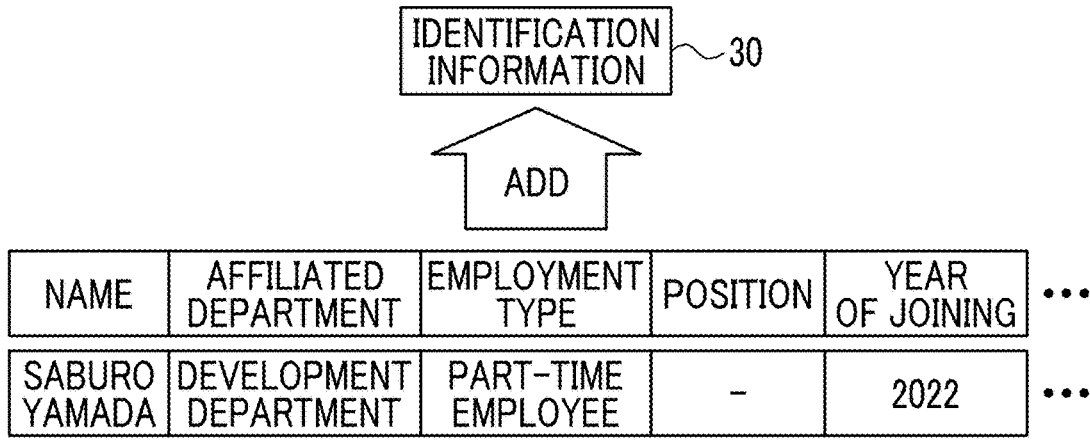
FIG. 5 is an explanatory diagram illustrating an example of updating identification information related to the access condition.
Figure 6:
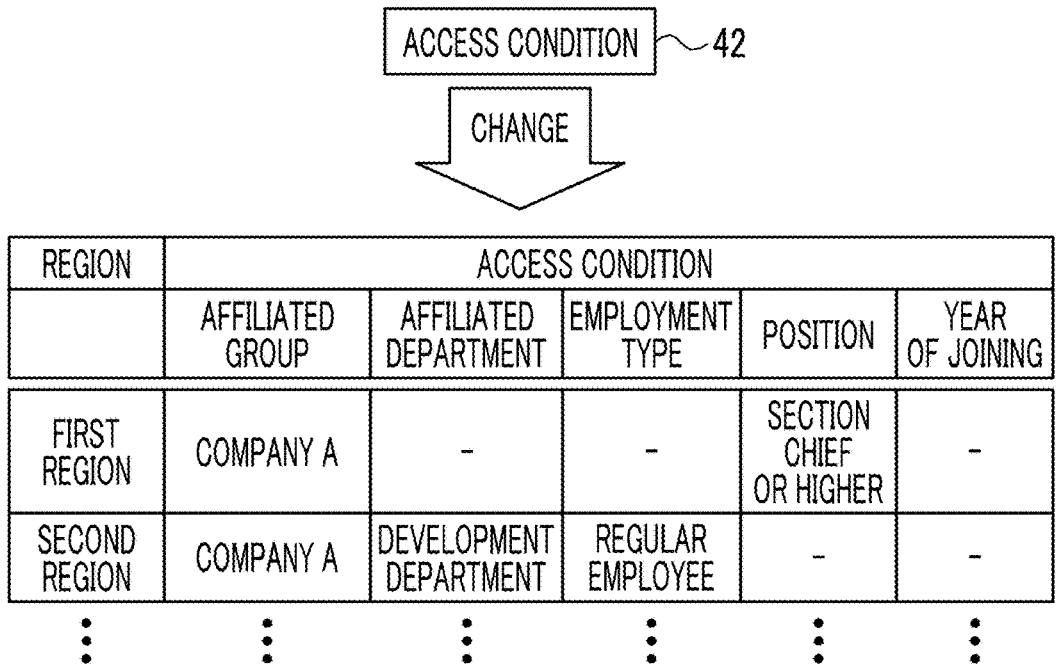
FIG. 6 is an explanatory diagram illustrating an example of updating the access condition.

That is, in a case where there is a change in the identification information 30, it may be necessary to perform a process such as changing the access condition 42 on the data store terminal 14 side in response to the change. Specifically, in a case where, for example, information illustrated in FIG. 5 is added as the identification information 30 by a circumstance such as a part-time employee entering a development department of Company A, it may be necessary to perform a process such as changing the access condition 42 on the data store terminal 14 side and not allowing an access to the second region 52 unless the employee is a regular employee even in a case where the employee is in the development department, as illustrated in FIG. 6. In consideration of such a case, in a case where the identification information 30 is changed, it is preferable to notify the data store terminal 14 side of the change.

Figure 7:
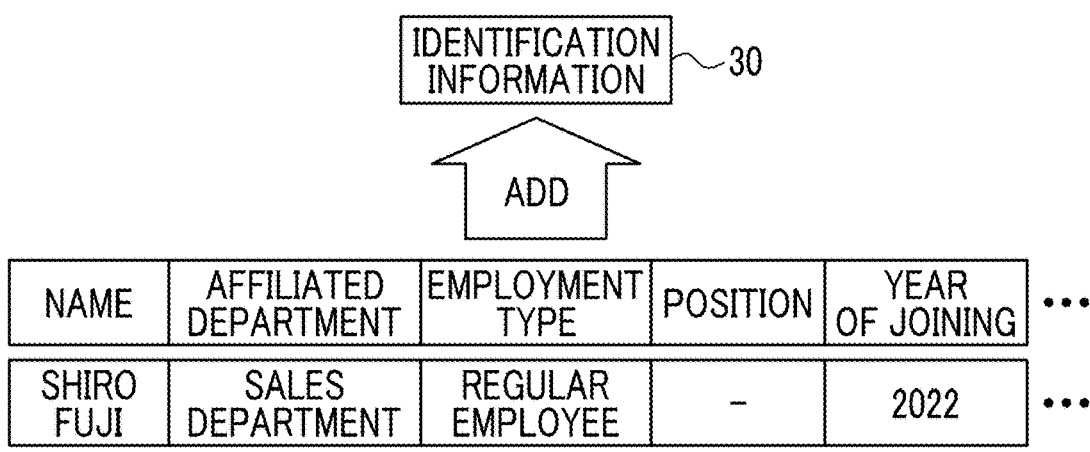
FIG. 7 is an explanatory diagram illustrating an example of updating identification information that is not related to the access condition.

On the other hand, for example, in a case where information illustrated in FIG. 7 is added as the identification information 30 by a circumstance such as assignment of a new graduate employee to the sales department of Company A, the change is a change that does not involve the access condition 42, and thus it is not necessary to change the access condition 42. Meanwhile, even in such a case, performing the notification described above causes unnecessary diffusion of the identification information 30. In addition, in order to prevent unnecessary diffusion of the identification information 30, it is also considered that the data store terminal 14 side discloses the access condition 42 to Company A and the notification is performed only in a case where a change related to the access condition 42 is performed. Meanwhile, in this case, unnecessary diffusion of the access condition 42 is caused.

Figure 8:
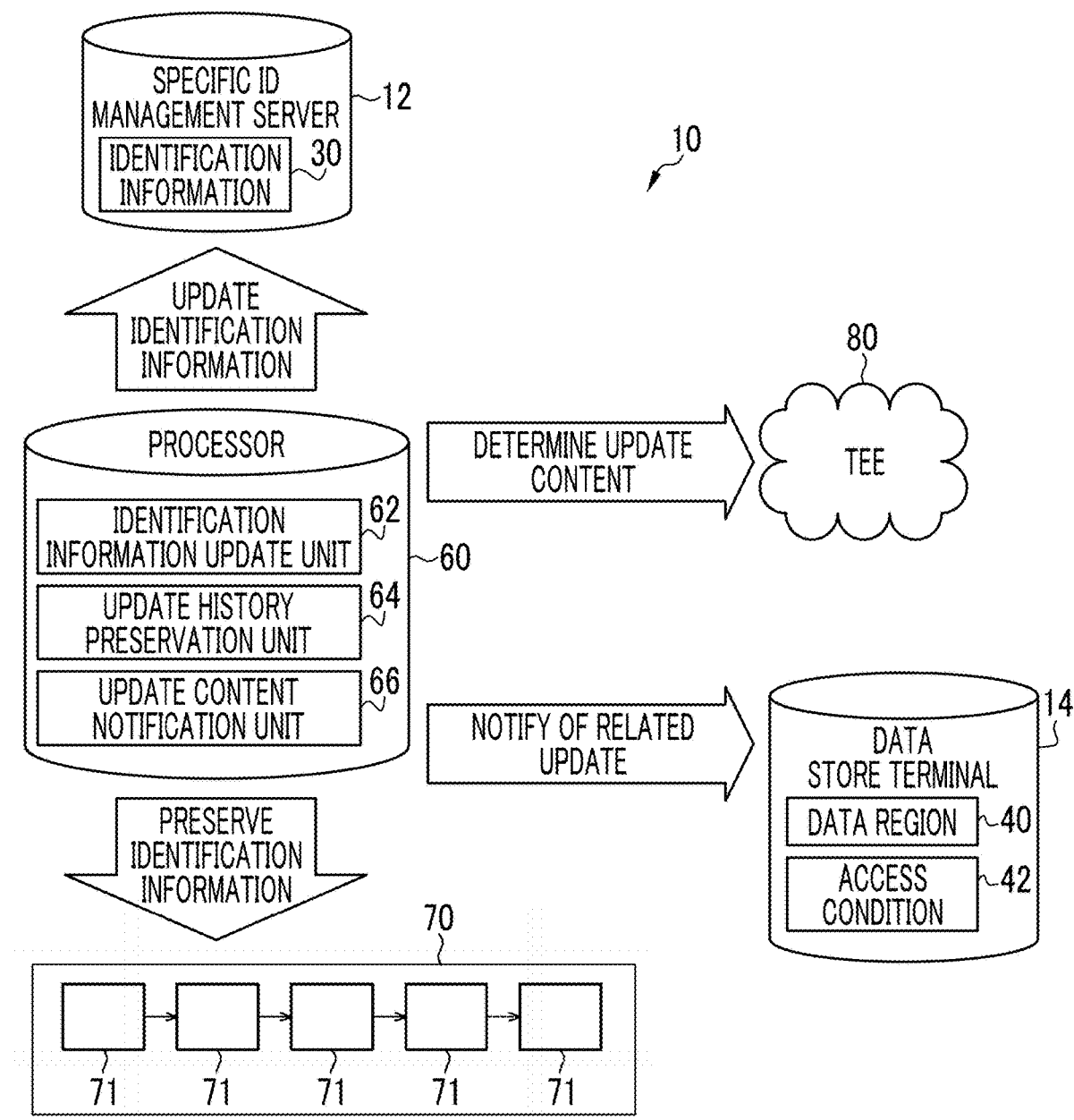
FIG. 8 is a schematic diagram illustrating the configuration of the access management system.

In consideration of such circumstances, the access management system 10 is provided with a processor 60 as illustrated in FIG. 8. The processor 60 functions as an identification information update unit 62, an update history preservation unit 64, and an update content notification unit 66, in association with execution of an update program for changing identification information or an access condition. The update program is activated (executed) in a case where an update process is started, for example, by launching update software for changing the identification information or the access condition from a terminal under management of Company A, such as the specific ID management server 12 or the terminals 31, 32, and 33.

The processor 60 may be one terminal itself (or a part of such one terminal), such as the specific ID management server 12, the terminals 31, 32, and 33, the data store terminal 14, or a dedicated terminal provided separately from these, and the present invention is not limited to the example in which the processor 60 is configured with such one terminal (the terminal itself or a part thereof). A plurality of such terminals (the terminals themselves or a part thereof) may be gathered, and these may function as the processor 60 in cooperation with each other.

The identification information update unit 62 accepts, for example, editing of the identification information 30 through a user interface (UI) of software for updating the identification information or the access condition, and updates the identification information 30 based on a content of the editing. Although the example in which the processor 60 functions as the identification information update unit 62 is described, the present invention is not limited to this. The specific ID management server 12 or the terminals 31, 32, and 33 may have a configuration of functioning as the identification information update unit 62.

The update history preservation unit 64 stores the content of the update (the updated identification information 30) on a blockchain 70 in a case where an update of the identification information 30 is performed. The blockchain 70 is constructed by a blockchain network composed of the specific ID management server 12, the data store terminal 14, and the like, and is obtained by connecting blocks 71 in time series, the block 71 including a hash value obtained by hashing the identification information 30 after the update and the identification information 30 immediately before the update. The update history preservation unit 64 generates the new block 71 each time the update of the identification information 30 is performed, and connects the new block 71 to the blockchain 70. In this manner, by storing the identification information 30 on the blockchain 70, it is possible to prevent tampering of the identification information 30.

An example in which the block 71 is configured with a hash value obtained by hashing the identification information 30 after an update and the identification information 30 immediately before the update is described, and the present invention is not limited to the example. The block 71 may be configured with two hash values, that is, a hash value obtained by hashing the identification information 30 after the update and the hash value obtained by hashing the identification information 30 immediately before the update.

In a case where the update of the identification information 30 is performed, the update content notification unit 66 determines whether or not a content of the update is related to the access condition 42. In this determination, the update content notification unit 66 compares an access availability mode of each user in a case where the identification information 30 immediately before the update is used (the number of users satisfying the access condition 42 of each region of the data region 40 and the like) with an access availability mode of each user in a case where the identification information after the update is used, and determines that the update content is related to the access condition 42 in a case where there is a change in the access availability mode before and after the update, and determines that the update content is not related to the access condition 42 in a case where there is no change in the access availability mode before and after the update.

For example, in a case where a change (update) of adding the information illustrated in FIG. 5 to the identification information 30 illustrated in FIG. 2 is performed, the number of users who can access the second region 52 of the data store terminal 14 is increased by this update (see FIG. 4). Therefore, it is determined that the update content is related to the access condition 42. On the other hand, in a case where a change (update) of adding the information illustrated in FIG. 7 to the identification information 30 illustrated in FIG. 2 is performed, there is no change in the number of users who can access any region of the data store terminal 14 by the update (see FIG. 4). Therefore, it is determined that this update content is not related to the access condition 42.

The update content notification unit 66 performs the determination described above with a trusted execution environment (TEE) 80 independent of an operating system (OS) of a terminal (the specific ID management server 12, the terminals 31, 32, and 33, the data store terminal 14, and the like) constituting the access management system 10. In addition, in the same manner as the processor 60, the TEE 80 may be formed with one terminal (the terminal itself or a part thereof), or a plurality of such terminals (the terminals themselves or a part thereof) may be gathered together to form the TEE 80 in cooperation with each other. In addition, the process performed by TEE 80 is not limited to the determination described above. A process other than the determination described above, which is performed in the access management system 10 or the processor 60, may be performed by the TEE 80.

Then, in a case where it is determined that the update content is related to the access condition 42, the update content notification unit 66 notifies the data store terminal 14 that the update is performed. In addition, the update content may be notified to the data store terminal 14 in synchronization with the notification. Here, in a case of notifying the update content, all of the update content (all of the identification information 30 after the change) may be notified, or only a part of the update content related to the access condition 42 may be extracted and notified.

Figure 9:
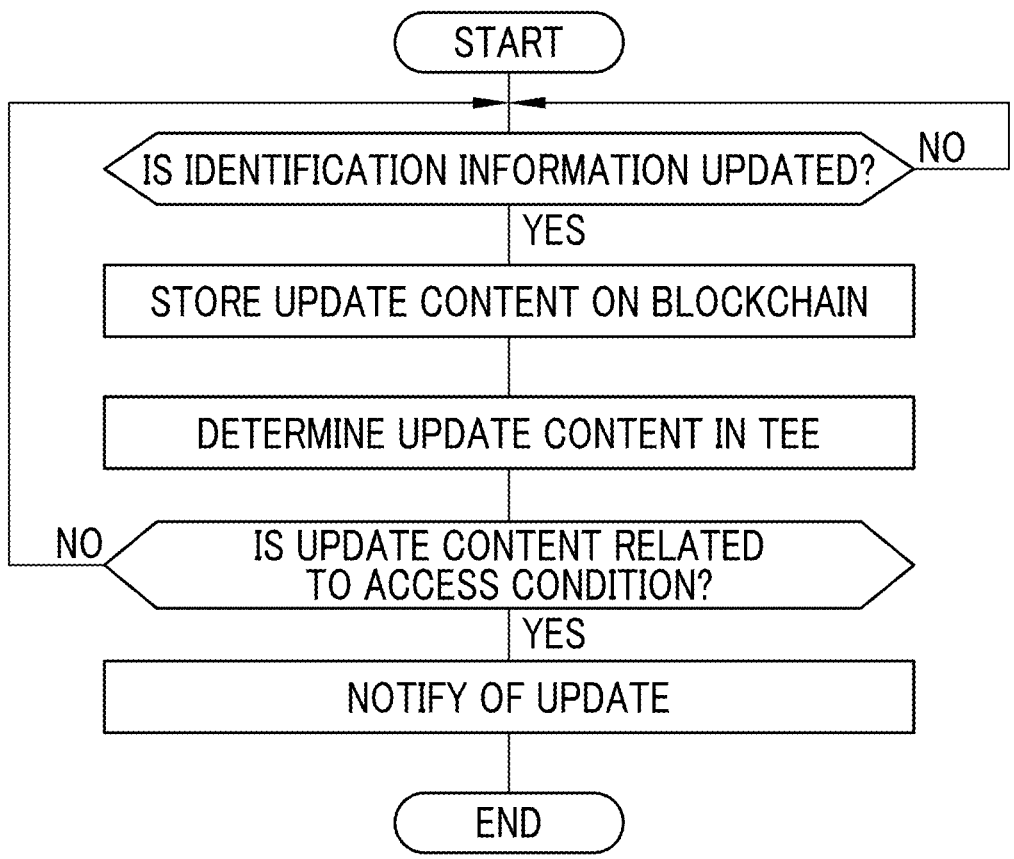
FIG. 9 is a flowchart illustrating a flow of a process of a first embodiment.

Hereinafter, a flow of a process performed by the processor 60 will be described with reference to FIG. 9. As illustrated in FIG. 9, in a case where an update of the identification information 30 is performed, a content of the update (identification information 30 after the update) is stored on the blockchain 70. In addition, in a case where the identification information 30 is updated, the TEE 80 determines whether or not the update content is related to the access condition 42. Then, in a case where it is determined that the update content is related to the access condition 42, the data store terminal 14 is notified that the update is performed.

In this manner, according to the access management system 10, the notification to the data store terminal 14 is performed only in a case where it is determined that the update content of the identification information 30 is related to the access condition 42, and thus, it is possible to prevent unnecessary diffusion of the identification information 30. In addition, since the determination as to whether or not the update content is related to the access condition 42 is performed by the TEE 80, it is possible to prevent unnecessary diffusion of not only the identification information 30 but also the access condition 42.

Second Embodiment

In the first embodiment, the configuration in a case where the identification information 30 is updated is described. In a second embodiment, a configuration in a case where the access condition 42 is updated will be described. In the following description, the same members as those in the first embodiment described above are designated by the same reference numerals, and the description thereof will be omitted.

Figure 10:
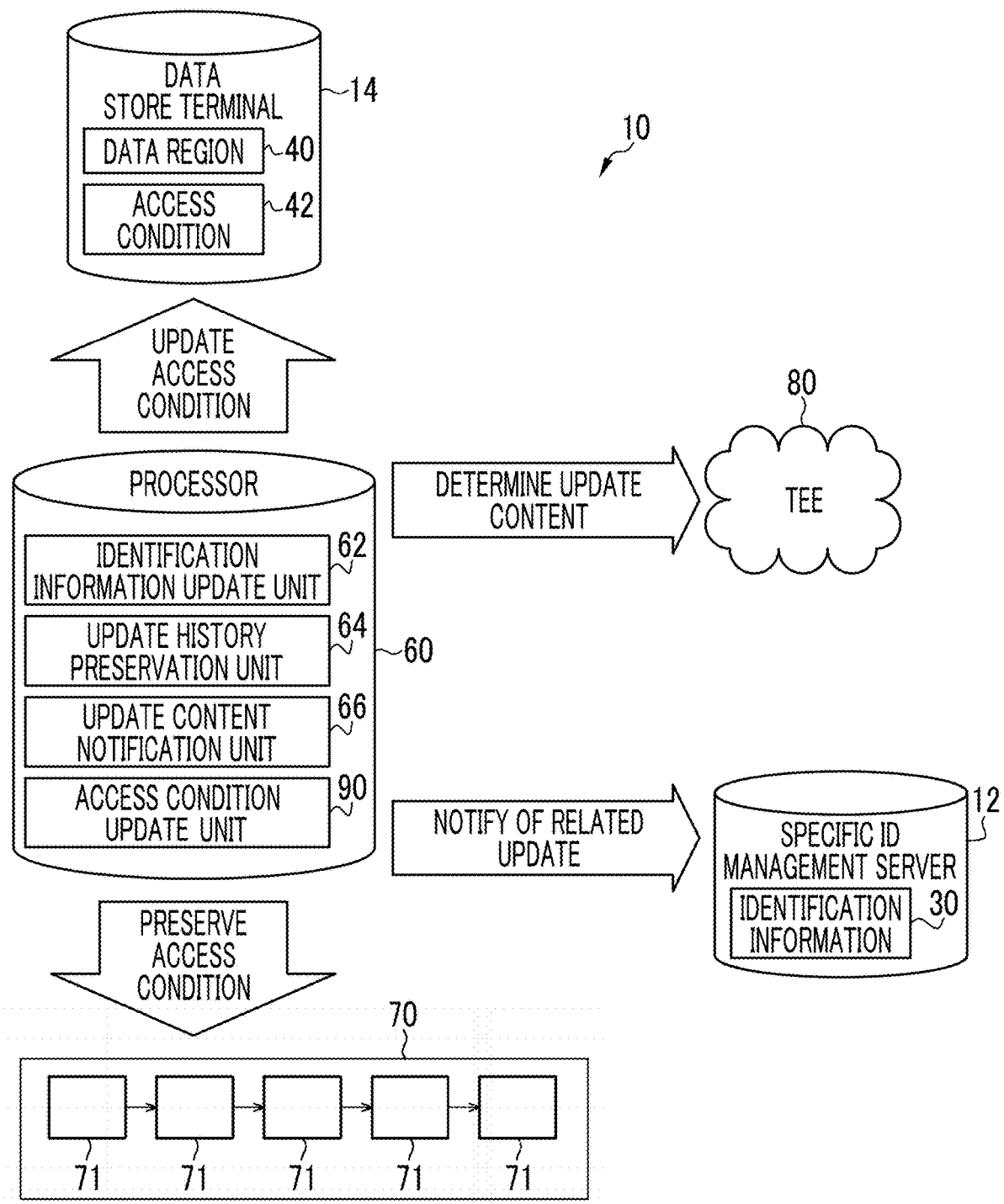
FIG. 10 is a schematic diagram illustrating the configuration of the access management system.

As illustrated in FIG. 10, in the second embodiment, the processor 60 also functions as an access condition update unit 90, in addition to the identification information update unit 62, the update history preservation unit 64, and the update content notification unit 66 described above, in association with execution of an update program for changing an identification information or an access condition. The update program is activated (executed) in a case where an update process is started, for example, by launching update software for changing the identification information or the access condition from the data store terminal 14 or the like.

The access condition update unit 90 accepts, for example, editing of the access condition 42 through a user interface (UI) of update software for changing the identification information or the access condition, and updates the access condition 42 based on an editing content. Although an example in which the processor 60 functions as the access condition update unit 90 is described, the present invention is not limited thereto. The data store terminal 14 may be configured to function as the access condition update unit 90.

Then, in the second embodiment, in a case where the access condition 42 is changed (updated), the update history preservation unit 64 stores the update content (the access condition 42 after the update) on the blockchain 70. In this manner, by storing the access condition 42 on the blockchain 70, it is possible to prevent tampering of the access condition 42. Although the example in which the update content of the access condition 42 and the update content of the identification information 30 are stored on the common blockchain 70 is described, the update content of the access condition 42 may be stored on a blockchain different from the blockchain 70 on which the update content of the identification information 30 is stored.

In addition, in the second embodiment, in a case where the access condition 42 is changed (updated), the update content notification unit 66 causes the TEE 80 to determine whether or not the update content is related to the identification information 30. Specifically, access availability modes of each user to the data region 40 before and after the change of the access condition 42 are compared, and the update content is determined to be related to the identification information 30 in a case where there is a change in the access availability mode, and the update content is determined to be not related to the identification information 30 in a case where there is no change in the access availability mode before and after the update.

Then, in a case where it is determined that the update content is related to the identification information 30, the update content notification unit 66 notifies a terminal under management of Company A, such as the specific ID management server 12, the terminals 31, 32, and 33, that the update is performed. The update content may be notified in synchronization with the notification. Here, in a case of notifying the update content, all of the update content (all of the access condition 42 after the change) may be notified, or only a part of the update content related to the identification information 30 may be extracted and notified.

Hereinafter, a flow of a process of the second embodiment will be described with reference to FIG. 11. As illustrated in FIG. 11, in a case where an update of the access condition 42 is performed, a content of the update (the access condition 42 after the update) is stored on the blockchain 70. In addition, in a case where the update of the access condition 42 is performed, the TEE 80 determines whether or not the update content is related to the identification information 30. Then, in a case where it is determined that the update content is related to the identification information 30, a notification that the update is performed is sent to a terminal under management of Company A, such as the specific ID management server 12, the terminals 31, 32, and 33.

In the embodiment described above, a hardware structure of the processing unit that executes various types of processes, such as the identification information update unit 62, the update history preservation unit 64, and the update content notification unit 66, and the access condition update unit 90 is various processors as described below. The various processors include a central processing unit (CPU) that is a general-purpose processor functioning as various processing units by executing software (programs), a programmable logic device (PLD) that is a processor of which a circuit configuration can be changed after manufacturing, such as a field programmable gate array (FPGA), a dedicated electrical circuit that is a processor having a circuit configuration exclusively designed to execute various types of processing, and the like.

One processing unit may be configured with one of these various processors, or may be configured with a combination of two or more processors of the same type or different types (for example, a combination of a plurality of FPGAs or a combination of a CPU and an FPGA). Further, a plurality of processing units may be configured with one processor. As an example of a configuration in which the plurality of processing units are configured with one processor, firstly, there is an aspect in which one processor is configured with a combination of one or more CPUs and software and the processor functions as the plurality of processing units as represented by a computer such as a client, a server, or the like. Second, as represented by a system on chip (SoC) and the like, an aspect of using a processor that implements functions of the entire system including the plurality processing units in one integrated circuit (IC) chip is included. In this manner, the various processing units are configured using one or more of the various processors as a hardware structure.

Further, the hardware structure of these various processors is more specifically an electric circuit (circuitry) in a form in which circuit elements such as semiconductor elements are combined.

EXPLANATION OF REFERENCES

10: access management system
12: specific ID management server
14: data store terminal
20: specific group
21, 22, 23: specific user
30: identification information
31, 32, 33: terminal
40: data region
42: access condition
51: first region
52: second region
60: processor
62: identification information update unit
64: update history preservation unit
66: update content notification unit
70: blockchain
71: block
80: TEE
90: access condition update unit

What is claimed is:

1. An access management system comprising:
a data store terminal that determines whether or not an access is available by collating identification information of a user who performs an access request with an access condition;
a specific ID management server that stores identification information of a specific user who is a user belonging to a specific group; and
at least one processor,
wherein the data store terminal accepts an access request from the specific user, which is an access request using the identification information stored in the specific ID management server, and
the processor is configured to:
    perform an update of the identification information stored in the specific ID management server;
    in a case where the update is performed, store a content of the update on a blockchain; and
    in a case where the update is performed, cause a trusted execution environment (TEE) independent of an operating system (OS) of the data store terminal and an OS of the specific ID management server to determine whether or not the update changed the access condition by comparing the content of the update with the access condition, notify the data store terminal that the update has been performed in a case where it is determined that the access condition is changed, and not notify the data store terminal in a case where it is determined that the access condition is not changed, to thereby prevent unnecessary diffusion of the access condition,
wherein the at least one processor has a hardware configuration.

2. The access management system according to claim 1, wherein the processor is configured to notify the data store terminal of the content of the update.

3. The access management system according to claim 2, wherein the processor is configured to notify the data store terminal of all of the content of the update.

4. The access management system according to claim 1, wherein the processor is configured to:
    perform an update of the access condition;
    store a content of the update of the access condition on the blockchain; and
    in a case where the update of the access condition is performed, cause the TEE to determine whether or not the update of the access condition is related to the identification information by comparing the content of the update of the access condition with the identification information, and notify the specific ID management server that the update of the access condition has been performed in a case where it is determined that the update of the access condition is related to the identification information.

5. The access management system according to claim 1, wherein the access condition is stored in the data store terminal.

6. The access management system according to claim 1, wherein the access condition is stored in a terminal different from the data store terminal.

7. The access management system according to claim 1, wherein the at least one processor is provided in the specific ID management server, and
the processor provided in the specific ID management server performs the update of the identification information.

* * * * *